United States Patent [19]

Frost

[11] Patent Number: 4,669,947
[45] Date of Patent: Jun. 2, 1987

[54] EARTH MOVING IMPLEMENT

[75] Inventor: Roger A. Frost, Uttoxeter, United Kingdom

[73] Assignee: J. C. Bamford Excavators Limited, Uttoxeter, England

[21] Appl. No.: 739,203

[22] Filed: May 30, 1985

[30] Foreign Application Priority Data

Jun. 19, 1984 [GB] United Kingdom ............... 8415653

[51] Int. Cl.$^4$ ............................................. E02F 3/76
[52] U.S. Cl. ..................... 414/724; 414/912; 37/117.5; 37/DIG. 3; 37/DIG. 12
[58] Field of Search ............... 414/607, 724, 912, 785; 37/117.5, DIG. 3, DIG. 12

[56] References Cited

U.S. PATENT DOCUMENTS

| | | | |
|---|---|---|---|
| 3,348,715 | 10/1967 | Kretz | 414/912 X |
| 3,458,069 | 7/1969 | Wickberg et al. | 37/117.5 X |
| 3,613,923 | 10/1971 | Albright | 414/912 X |
| 4,247,243 | 1/1981 | Carter | 414/724 |
| 4,285,628 | 8/1981 | Jankowski | 414/912 X |
| 4,422,819 | 12/1983 | Guest | 414/724 |

Primary Examiner—L. J. Paperner
Assistant Examiner—Lyle Kimms
Attorney, Agent, or Firm—Marshall, O'Toole, Gerstein, Murray & Bicknell

[57] ABSTRACT

An earth moving implement which, in use, is mounted on a boom which is attached to an excavating or other vehicle, comprises a bucket mounted on a boom of a vehicle, at least one loading fork, a mounting link secured to the bucket for movement between a lower extreme position, and an upper position, the link having first and second abutments, the loading fork being pivotally mounted on the mounting link for movement between an "in use" position when the mounting link is in its lower extreme position, and the fork extends generally forwardly of the bucket, and a part of the fork is in engagement with the first abutment to prevent movement of fork towards the bucket, and a stowed position when the mounting link is is an upper position and a further part of the fork is in engagement with the second abutment of the mounting link to prevent further pivotal movement of the fork relative to the mounting link.

9 Claims, 3 Drawing Figures

EARTH MOVING IMPLEMENT

BACKGROUND TO THE INVENTION

1. Field of the Invention

This invention relates to an earth moving implement which, in use, is mounted on a boom which is attached to an excavating or other vehicle.

2. Description of the Prior Art

One such known implement comprises a bucket, also called a shovel, which may be filled with earth by driving the vehicle forwardly and/or extending the boom, the bucket having one or more loading forks mounted thereon, the fork or forks being pivotable from an "in use" position wherein the forks extend forwardly away from the bucket, to a stowed position wherein the fork or forks are generally behind the bucket. This pivotal movement is accomplished by removing at least one locking pin which retains the fork or forks in the "in use" position from engagement with a first opening provided in a mounting of the bucket, and engaging the pin in a second opening of the mounting of the bucket after the fork or forks have been pivoted to their stowed position, to retain the fork or forks in their stowed position.

It will be appreciated that the term "earth" as used herein is intended to cover not only soil, but rubble, sand and any other type of material the implement is to move.

The problem with known earth moving implements is the difficulty in removing and re-engaging the locking pin, particularly where the implement has been in prolonged use and the bucket/fork mounting is, for example, covered with mud.

SUMMARY OF THE INVENTION

It is an object of the present invention to provide a new or improved earth moving implement which overcomes or reduces this problem.

According to a first aspect of the invention, we provide an earth moving implement comprising a bucket having means to mount the bucket on a boom of a vehicle, at least one loading fork, a mounting link pivotally secured to the bucket for movement between a lower extreme position, and an upper position, the link having first and second abutments, the loading fork being pivotally mounted on the mounting link for movement between an "in use" position when the mounting link is in its lower extreme position, and the fork extends generally forwardly of the bucket, and a part of the fork is in engagement with the first abutment to prevent movement of fork towards the bucket, and a stowed position when the mounting link is in an upper position and a further part of the fork is in engagement with the second abutment of the mounting link to prevent further pivotal movement of the fork relative to the mounting link.

Thus, in such an arrangement, there is no need to remove any locking pin to permit the fork to be moved between its "in use" and stowed positions. In use, the fork is supported by the engagement of said part of the fork with the first abutment, and when it is required to stow the fork, it is simply necessary to pivot the fork initially, and then the fork with the mounting link when the further part of the fork engages the second abutment to the stowed position.

The first and second abutments may comprise alternative parts of a common member such as a spigot member which may extend parallel to the pivotal axis of the fork on the mounting link, although if desired the first and second abutments could be provided by separate members.

The lower extreme position of the mounting link may be governed by engagement of an abutment surface of the mounting link with a corresponding abutment surface of the bucket when the mounting link is in this position. Preferably, the mounting link has a cut-away portion in which said abutment surface is provided, and the bucket has a projecting portion which provides said corresponding abutment surface, although other arrangements are possible. Further, the loading fork may engage a part of the bucket, when in its "in use" position, to provide further support against pivotal movement of the fork.

The loading fork preferably comprises first and second arms which may be perpendicular or generally perpendicular to each other, or at other angles. The arms are preferably formed integrally, although could be separate and secured together as desired, the first arm being pivotally mounted on the mounting link and the second arm, in use, engaging the load. The pivotal mounting of the first arm with the mounting link may be spaced inwardly from the end of the first arm remote from the second arm in which case the part of the fork which engages the first abutment, in use, may comprise a forwardly facing area of the first arm between the pivotal mounting and the end thereof. The further part of the fork which engages the second abutment may comprise a further area of the first arm on the same face as the first mentioned forwardly facing area, but spaced further inwardly from the end of the first arm, beyond the pivotal mounting.

Preferably, when the fork is in its "in use" position, the first abutment is located forwardly of, and above, the axis of pivot of the fork to the mounting link, and when the fork is in its stowed position, the second abutment is located rearwardly of, and below, the axis of pivot of the fork to the mounting link.

Thus when the fork is stowed, the mounting link may extend generally upwardly and the first arm of the fork generally horizontally, the second arm of the fork depending downwardly. The free end of the second depending arm of the fork may, when the fork is in its stowed position, be additionally secured at the rear of the bucket, for example with a retaining pin, to prevent any relative movement between the fork and the bucket, which could result in an unwanted vibration.

If desired, means may be provided to prevent the mounting link pivoting beyond the generally upwardly extending position when the link is stowed.

Such means may include a third abutment on the mounting link, which may engage an upper part of the bucket, rearwardly of the pivotal mounting of the fork to the bucket.

The bucket preferably comprises a forwardly opening internal chamber, bounded at the lower edge thereof with a cutting edge which may have one or more teeth, at the rear by a rear wall on the outer side of which lugs may be provided to permit of mounting of the bucket on the end of the boom, and at the sides by side walls. The upper end of the rear wall may have a rolled-over edge to provide the projecting portion of the bucket which engages in the cut-away portion of the mounting link, and with which the third abutment, where provided, engages. Above said rolled-over edge, the bucket may have a bar which extends generally horizontally between the side walls and which may provide the pivotal mounting for the mounting link of the earth moving/loading implement.

Preferably, at least two forks are provided each being pivotally mounted to a mounting link as hereinbefore described, both mounting links being pivotally secured to the bar of the bucket.

The forks may be arranged to be pivoted independently between their "in use" and stowed positions, or could be arranged to be pivoted as a unit, again as required.

According to a second aspect of the invention, we provide a vehicle having a boom attached thereto, the outer end of which has an earth moving/loading implement according to the first aspect of the invention, mounted thereon.

The vehicle may have power means, such as hydraulic rams, to permit of pivoting of the boom relative to the vehicle and pivoting of the implement relative to the boom.

BRIEF DESCRIPTION OF THE DRAWINGS

The invention will now be described with the aid of the accompanying drawings, in which.

DESCRIPTION OF THE PREFERRED EMBODIMENTS

Figure 1:
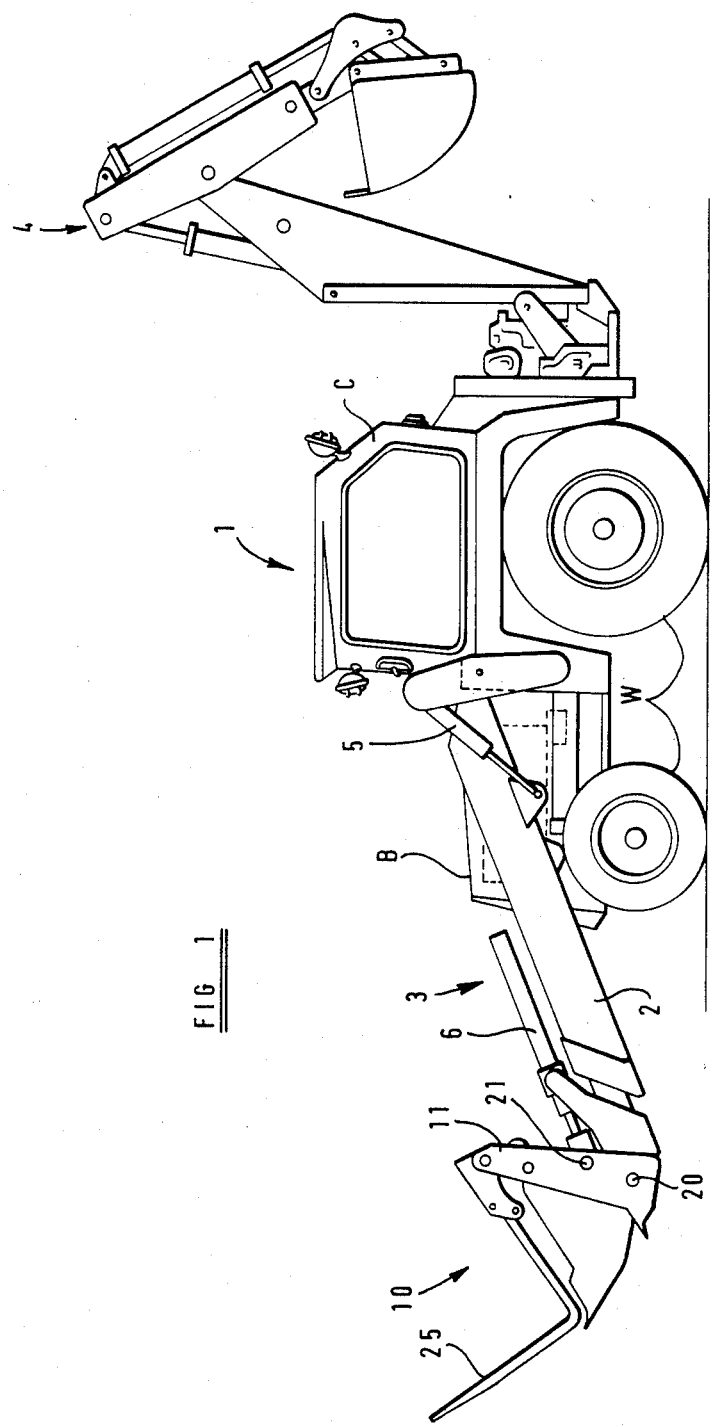
FIG. 1 is a diagrammatic side view of a vehicle having an earth moving implement in accordance with the invention.

Referring to FIG. 1 of the drawings, a vehicle comprises a body 1 to which are pivoted at the front of the vehicle a pair of spaced arms 2 of a boom 3, and at the rear of the vehicle a digger arm 4 of known construction.

Between the boom 3 and the body 1, hydraulic rams 5 extend, one at each side of the vehicle, to provide power lift for the boom 3.

At the outer end of the boom 3, an implement 10 is mounted which comprises a bucket 11 and a pair of forks 25, which implement 10 is disclosed in more detail below, with reference to FIGS. 2 and 3. Between the implement 10 and the boom 3 are further hydraulic rams 6 which are operative to cause pivoting of the implement 10 relative to the boom 3.

The body 1 of the vehicle has wheels W, and an engine under a bonnet B to drive the wheels and provide power for the hydraulic system of the vehicle and a cab C for an operator, from which cab C the operator can control the boom, and the implement by operating hydraulic valves which provide hydraulic power to the rams 5, 6.

Figure 2:
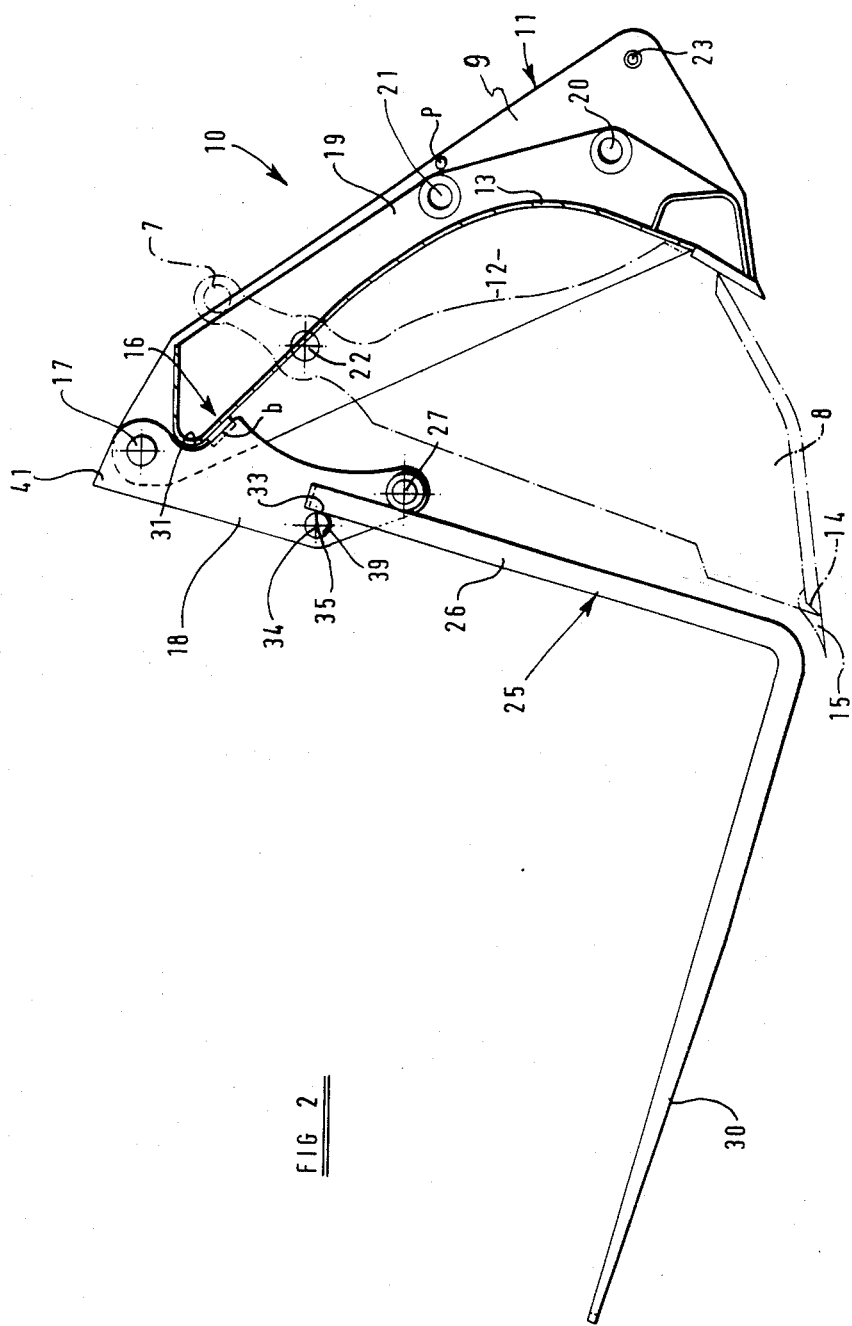
FIG. 2 is a first cross-section through an earth moving/loading implement according to the invention, with loading forks thereof in an "in use" position.
Figure 3:
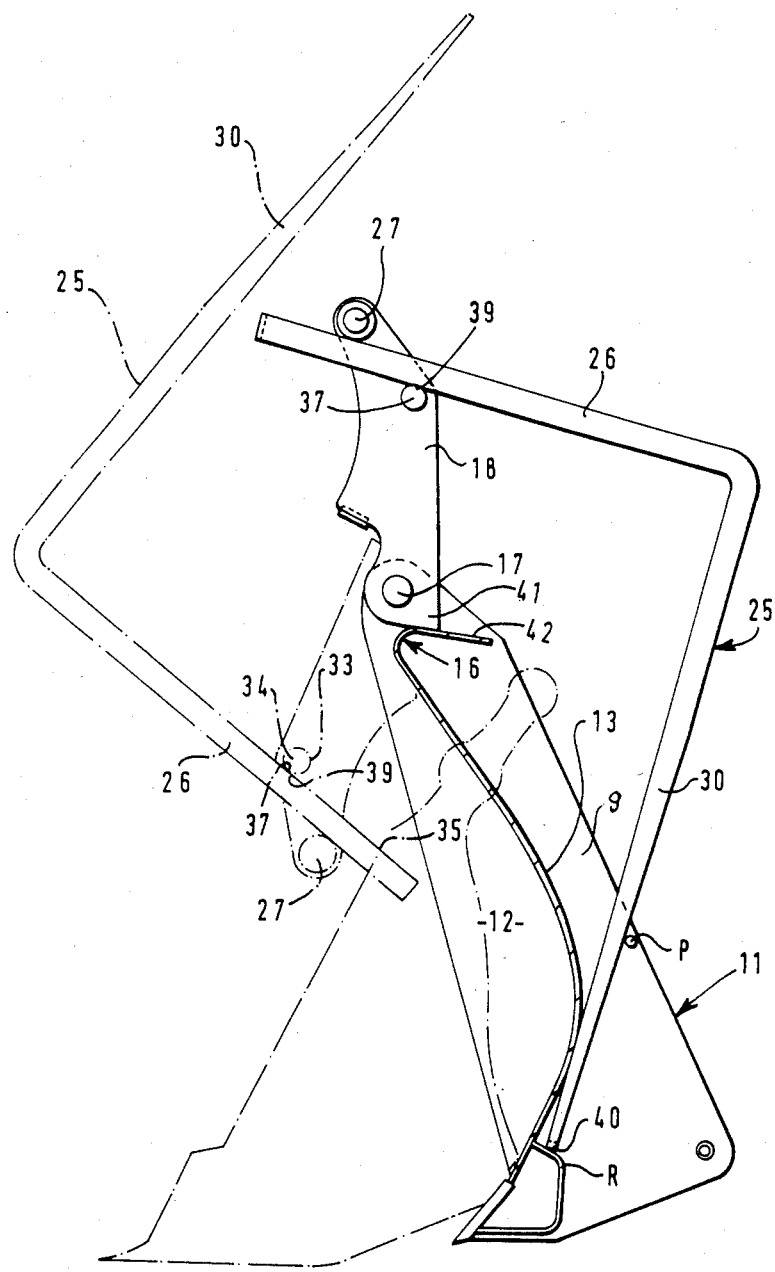
FIG. 3 is a second side cross-sectional view through the implement of FIG. 1 but showing the loading forks in a stowed position, and indicating an intermediate position.

Referring now to FIGS. 2 and 3, the earth moving implement 10 comprises a bucket 11 of the clam type, having a front part 8, which is indicated in dotted lines in both FIGS. 2 and 3, pivotally connected at 22 to a rear part 9, although the invention is equally applicable to a bucket or shovel having a single part only.

The front part 8 has an extension 7 to which one end of a hydraulic ram (not shown) is pivotally secured, the other end of the ram being secured to the rear part 9, at 23 so that movement between the front part 8 and the 23 can be achieved. The rear part 9 of the bucket 11 has side walls 12 and a rear wall 13, the rear wall 13 being curved, with the side walls 12 and front part 8 of the bucket 11 defining an internal chamber to receive earth, the lower edge of the chamber being bounded by a cutting edge 14 of the front part 8 on which a plurality of teeth 15 are provided as is well known in the art. An alternative bucket may have a rear wall 13 made up of a plurality of flat plates and/or the cutting edge 14 may not have teeth 15 as required.

At the upper end of the chamber, the rear wall 13 is rolled over to provide a projecting portion 16 which bounds the upper edge of the chamber. Extending between the side walls 12 above the rolled over portion 16, is a horizontally extending bar 17 which provides a mounting for a mounting link 18 of the implement 10, the purpose of which is described in more detail hereinafter.

Projecting from the rear wall 13 of the bucket 11 are two pairs of flanges 19 which have aligned openings 20 to enable the implement 10 to be pivotally mounted on the ends of a pair of limbs of a boom (not shown). Hydraulic rams (not shown) are pivotally connected at one end to the flanges at 21, and at their other ends to the boom directly or via a linkage, to enable the implement 10 to be tipped forwardly and backwardly by power means about the axis of openings 20.

Thus the bucket 11 may be used to move/excavate the earth, although as shown in FIG. 1, loading forks 25 of the implement are in an "in use" position and it is intended that these should be used for loading rather than the bucket for excavating when the forks 25 are in this position.

The loading forks 25, two of which are provided, although only one is seen in the cross-sectional view, each comprise a first arm 26 which is pivotally mounted on the mounting link 18 via a pivot 27, and a second arm 30 which is generally perpendicular to arm 26 although could be at other angles. The arms 26, 30 of the fork 25 are preferably formed integrally although could be formed separately and connected together if required.

The mounting link 18, is, in FIG. 1, in an extreme lower position, a cut out portion 31 having a bearing block b providing an abutment surface with which a corresponding abutment surface provided by the projecting portion 16 of the bucket engages to prevent the mounting link 18 moving further downwardly or towards the bucket 11, by any anti-clockwise rotation as seen in the drawings.

The forks 25, which when in the position shown in FIG. 1, extend forwardly away from the bucket 11, and are restrained against moving towards the bucket during loading for example, by a first abutment 33 provided by a part of a spigot member 34 which is secured to the remainder of the mounting link 18, for example by welding, the abutment 33 engaging a first forwardly facing area 35 of the first arm 26 of the fork 25 between pivot 27 and the end of the arm 26 remote from the second arm 30. When in this position, the forks 25 may be used for loading as required. Any load on the forks would merely increase the force exerted between the area 35 of the fork and the abutment 33 and between block b and portion 16.

Further, the part of the fork 25 where the first and second arms are connected, abuts the cutting edge 14 of the bucket, to give further support against anti-clockwise rotation of the forks during loading. Of course, any other convenient part of the forks 25 could engage any other convenient part of the bucket.

The forks 25 can be manoeuvred by tipping the implement 10 using the hydraulic rams attached at openings 21, and by lifting and lowering of the boom, and/or by opening and closing the front bucket part 8 relative to the rear bucket part 9.

It can be seen in FIG. 1 that the first abutment 33 is located forwardly and above the pivot 27 of the loading forks.

When it is desired to use the bucket 11 rather than the loading forks 25, the forks 25 can be pivoted to a stowed position, as shown in FIG. 2. There is no resistance in pivoting the forks 25 clockwise away from the bucket 11, so that by raising the forks as shown in ghost lines in FIG. 2, the engagement between the abutment 33 and part 35 of the first arm 26 will be released, but a further part 37 of the first arm 26 on the same face as the part 35, will eventually engage a second abutment 39 which in this embodiment is provided by an alternative part of the spigot member 34. Of course, separate first and second abutments could be provided if required.

When the forks 25 are pivoted to this intermediate position, any further upward movement of the forks 25 will cause the mounting link 18 to pivot clockwise about pivot 17 by virtue of engagement between the part 37 with the second abutment 39. Thus, the abutment surfaces provided by the block b in the cut away portion 31 of the mounting link 18 and projecting portion 16 of the bucket 11, will become disengaged and the forks 25 and mounting link 18 will pivot as a unit, about pivot 17 until an abutment 41 of the mounting link engages the upper surface 42 of the rolled over portion 16 behind the pivot axis 17. The free ends 40 of the second arms 30 of the forks 25 may engage a receiving means R on the rear face 41 of the rear wall 13 of the bucket 11, between the flanges 19. The forks 25 may then be secured by retaining pins P, or otherwise as desired.

It can be seen from FIG. 2 that when the mounting plate 18 is in its upper position, with the forks 25 stowed, the second abutment 39 is located below and rearwardly of the pivot 27 of the forks 25 to the mounting link 28.

With both the forks 25 secured in this stowed position, the bucket 11 may be used as required. Any relative movement between the forks 25, mounting link 18 and bucket 11 will be resisted so that there is no tendency for the forks 25 to return to their "in use" position.

The two forks 25 may be pivotable independently between their in use position shown in FIG. 1, and their stowed position shown in FIG. 2, or may be movable as a unit if required, although the former arrangement is preferred as this facilitates handling, which is otherwise difficult due to the weight of the forks 25.

Preferably each of the forks 25 are movable along the bar 17 of the bucket 11 so that any desired spacing may be obtained between the forks 25 so as to provide versatility in handling loads of different width. The forks 25 may be locked in any desired horizontal position along the bar 17 by any desired means.

Of course, when it is desired to use the loading forks 25 again, these may be pivoted anti-clockwise to their "in use" position shown in FIG. 1, until further movement of the forks 25 is resisted by engagement of the mounting link 18 with the bucket 11, and engagement of the forks with the first abutments, and engagement of the forks with the cutting edge 14 of the bucket.

Many modifications may be made to the implement 10 described without departing from the scope of the invention.

For example, the mounting link 18 need not be of the configuration shown, having a cut away portion which engages with a projecting portion of the bucket, but downward movement of the forks 25 beyond a lower extreme position may be resisted in any other way.

If desired, the mounting link 18 may be prevented from moving beyond the upper position shown in FIG. 2, by engagement of one or more further abutments additional to abutments 41.

I claim:

1. An earth moving implement comprising a bucket, means to mount the bucket on a boom of a vehicle, at least one loading fork comprising first and second arms which are fixed relative to one another, a mounting link, means pivotally securing the mounting link to the bucket for movement between a lower extreme position and an upper position, the mounting link having first and second abutment means, means mounting the loading fork on the mounting link for movement between an "in use" position in which the mounting link is in the lower extreme position and the second arm of the fork extends generally forwardly of the bucket while a part of the first arm of the fork is in engagement with the first abutment means, and a stowed position in which the mounting link is in the upper position and a further part of the first arm of the fork is in engagement with the second abutment means of the mounting link with the second arm of the fork lying generally rearwardly outside of the bucket.

2. An implement according to claim 1 wherein the first and second abutment means comprise alternative parts of a common member which extends parallel to a pivotal axis of the fork on the mounting link.

3. An implement according to claim 1 wherein the lower extreme position of the mounting link is governed by engagement of an abutment surface of the mounting link with a corresponding abutment surface of the bucket.

4. An implement according to claim 1 wherein the means pivotally mounting the first arm of the fork on the mounting link is at a position spaced inwardly from the end of the first arm remote from the second arm, the part of the fork which engages the first abutment, in use, comprising a forwardly facing area of the first arm between the pivotal mounting and the end thereof.

5. An implement according to claim 4 wherein the further part of the fork which engages the second abutment means comprises a further area of the first arm on the same face as the first mentioned forwardly facing area, but spaced further inwardly from the end of the first arm, beyond the pivotal mounting.

6. An implement according to claim 1 wherein when the fork is in its lower extreme position, the first abutment means is located forwardly of, and above, the axis of pivot of the fork to the mounting link, and when the fork is in its stowed position, the second abutment means is located rearwardly of, and below, the axis of pivot of the fork to the mounting link.

7. An implement according to claim 1 wherein means are provided to prevent the mounting link pivoting beyond the generally upwardly extending position when the link is stowed, said preventing means including a third abutment means on the mounting link, which engages an upper part of the bucket, rearwardly of the pivotal mounting of the fork to the bucket.

8. A vehicle having a boom attached thereto, the outer end of which has an earth moving implement mounted thereon, the implement comprising a bucket, means to mount the bucket on a boom of the vehicle, at least one loading fork comprising first and second arms which are fixed relative to one another, a mounting link, means pivotally securing the mounting link to the bucket for movement between a lower extreme position and an upper position, the mounting link having first and second abutment means, means mounting the loading fork on the mounting link for movement between an "in use" position in which the mounting link is in the lower extreme position and the second arm of the fork extends generally forwardly of the bucket whilst a part of the first arm of the fork is in engagement with the first abutment means, and a stowed position in which the mounting link is in the upper position and a further part of the first arm of the fork is in engagement with the second abutment means of the mounting link with the second arm of the fork lying generally rearwardly outside of the bucket.

9. A vehicle according to claim 8 wherein power means are provided to permit of pivoting of the boom relative to the vehicle and pivoting of the implement relative to the boom.

* * * * *